UNITED STATES PATENT OFFICE 2,477,912

ALGINATE CONTAINING ADHESIVE COMPOSITIONS

Vance V. Vallandigham, Park Ridge, Ill., assignor to Kelco Company, San Diego, Calif., a corporation of Delaware No Drawing. Application December 11, 1945, Serial No. 634,387

3 Claims. (Cl. 106—208)

The invention described herein relates to adhesive pastes of the type prepared from substantially water-soluble, organic materials such as amylaceous substances, animal glues or mixtures thereof, using water as a vehicle, and to a modification of standard formulae by which certain characteristics of such products are improved.

Adhesives prepared from animal glues and amylaceous materials have two principal applications—for laminating paper or boxboard sheets, as in the manufacture of cartons, and for the production of dried films to be remoistened, as on adhesive tapes, labels and the flaps of envelopes.

For lamination the principal requirement is that a firm bond between the assembled sheets be formed rapidly, enabling the laminating machines to be operated at a high speed without risk of separation or curling.

For remoistening, as when labels, gummed tape, wall paper and envelope flaps are coated on one side and dried, the requirements are much more severe. The dried coating must be flexible and free from tendency to chip or scale. It should develop a high gloss. It should take water readily and develop initial adhesion or tack instantly. The tendency of the coated sheet to curl or warp in drying should be reduced to the greatest possible extent or altogether avoided. The remoistened adhesive coating must adhere firmly to such difficult surfaces as glass, sheet metal, unfinished wood and plaster. Coatings for wall paper must have a well developed slip—the ability to move the moistened strip into the exact position desired before it seizes—while in prepasted tape the opposed property of high initial adhesion is requisite.

Great numbers of adhesive compositions for each of the above uses have been developed, using glues, starches and partly or completely dextrinized starches as the basic ingredient, together with modifying agents such as urea, the alkali metal acetates, lactates, borates and nitrates, ammonium, sodium and calcium chloride, glycerine or other polyhydric alcohols, and sulfonated castor oil. Many of these compositions have a high efficiency in the various uses for which they are intended and I do not propose any new adhesive composition per se, but only a modification of the known starch, dextrin and glue adhesives by which certain improvements in their properties are effected.

The attainment of the most desired combination of properties in an aqueous adhesive, particularly in one which is composed mainly of amylaceous materials, is hampered by the requirement for at least partial water-solubility of the base and by the tendency of increasing solubility to promote penetration of the adhesive into fibrous materials such as paper.

The unaltered starches, which are dispersible but are substantially insoluble in water, produce too weak a bond to be useful for most purposes. The strength of the bond is increased by partial dextrinization of the starch, by which it is rendered partly water-soluble, and in general terms the strength of the bond is increased with increasing water-solubility.

On the other hand, the soluble portion of the composition readily penetrates below the surface of fibrous materials such as paper, the dried coating tends to be lacking in lustre, and the coated paper tends to warp and curl as it dries. Further, the portion of the adhesive which passes below the surface of the coated sheet, whether dried for remoistening or used immediately as in lamination, serves no useful purpose and is effectively lost.

I have discovered that by the addition to many or most of the starch or dextrin or glue adhesives of a relatively minute proportion of a water-soluble algin (salt of alginic acid), penetration into fibrous or porous substances may be reduced to almost any extent desired. I have also discovered that this reduction in penetration is attended by certain desirable effects which will be pointed out in connection with the example following.

*Example 1.—Lamination*

A laminating adhesive was made up as follows:

| | Percent |
|---|---|
| Starch, partially dextrinized | 1300# = 44.83 |
| Sodium nitrate | 100# = 3.45 |
| Borax | 50# = 1.72 |
| Water | 1450# = 50.00 |

This mixture was heated to 170° Fahr. and agitated until the temperature had fallen to 90°. The viscosity at 80° Fahr. of the cooked composition was 2800 centipoises.

To a batch prepared as above was added 5# of a high viscosity sodium alignate dissolved in 280# water, this addition giving the following percentage composition:

| | Percent |
|---|---|
| Starch and dextrin | 40.81 |
| Sodium nitrate | 3.14 |
| Borax | 1.57 |
| Sodium alginate | 0.16 |
| Water | 54.32 |

These two compositions were used in laminating beer case stock consisting of two liners of #47 kraft and two fillers of a low grade chipboard having a high asphalt content.

Using the adhesive of the first formula, which contains no algin, the maximum machine speed was 120 feet per minute and the consumption of adhesive, on the dry basis, was 5.00 pounds per 1,000 square feet. The addition of the algin in the second formula permitted the machine speed to be increased to 250 feet per minute and reduced the consumption of dry adhesive to 3.46 pounds per 1,000 square feet, or slightly over 30%, while obtaining perfect adhesion between the plies.

*Example 2.—Gummed tape*

A remoistening adhesive was prepared according to the following formula:

| | Per cent |
|---|---|
| Dextrin | 80# = 9.30 |
| Bone glue | 320# = 37.21 |
| Glucose | 10# = 1.16 |
| Water | 450# = 52.33 |

To this quantity of adhesive composition was added 1.3# of high viscosity sodium alginate, equal to 0.3% of the dry weight of the composition. The two compositions were spread on tape paper and dried. The paper coated with the composition containing no alginate curled strongly and the dried tape had to be run through breaker rolls to flatten it. After adding the alginate the tendency to curling practically disappeared. The addition of the alginate increased the wettability of the tape and the initial tack on remoistening. The gloss of the dried coating was materially improved and the consumption of adhesive per ream of paper was reduced from 19.0# to 16.5#, or about 13%.

*Example 3.—Prepasted wall paper*

A standard brand of prepared white paste which contains 30% solids consisting of a mixture of starches with relatively small proportions of glycerine, urea, borax and sodium nitrate was diluted with an equal volume of a 2% aqueous solution of a low viscosity sodium alginate. The dilution reduced the content of solids from 30% to 15.5%.

The two compositions, before and after addition of the algin, were used in prepasting wall paper under identical conditions. In the use of the composition free from algin, 6 pounds of adhesive (dry basis) were required per 1,000 square feet to obtain a satisfactory coating. In the use of the composition containing algin the consumption was reduced to 4 pounds per 1,000 square feet without reducing any of the desired properties of slip, tack, bond and freedom from tendency to curl.

The above and many other experiments, together with practical experience, indicate clearly that the major advantages attendant on the use of algins in aqueous adhesives is due to the extreme colloidality of the soluble algins. This property renders them highly nonfilterable, the algin forming a glaze over the surface of any porous septum which inhibits the further passage of liquid through or into it.

Thus the soluble and effective portion of the adhesive is retained on the surface of the sheet, where it is useful, instead of passing below the surface to a position in which it is detrimental.

The results of this retention of soluble matter on the surface of the sheet are increased quantitative effectiveness, improved bond and tack, and the formation of a varnish-like and glossy film. The lack of any substantial wetting of the coated side of the sheet is responsible for the avoidance of unequal shrinkage which leads to warping and curling. The improved wettability is due to the highly hydrophilic character of the soluble algins, which is manifested even in cases were the quantity of algin present in the solids is very minute.

In using algins in adhesives of the above types, certain precautions should be observed. First, if conditions permit, it is desirable to predissolve the algin in part of the water used in making up the paste, this particularly if the composition consists in large part of highly soluble dextrin.

If the complete composition is desired in the dry form, as an article of commerce, the components should be ground together to a fine powder. The attempt to cook together a starch or dextrin and a high viscosity algin in coarse powder may lead to the separation of the algin and subsequent difficulty in its dispersal.

Under some conditions the water-soluble alginates may be incompatible with calcium salts, the insoluble calcium alingate being formed. The addition of soluble calcium salts such as calcium chloride should be avoided and in formulating compositions containing large proportions of bone glue a glue relatively free from lime should be selected. If the presence of lime is unavoidable, difficulty due to precipitation of the algin may be avoided by the addition of a buffering agent such as trisodium phosphate.

Large proportions of soluble salts such as sodium nitrate and borax sometimes have an adverse effect on the algins, tending toward granulation. The use of sodium nitrate will usually be found unnecessary when an algin is added, and should be avoided, while the proportion of borax should be reduced as far as possible.

The quantity of a high viscosity algin to be added to an adhesive formula to produce the optimum benefit will be found to range from 0.2% to 0.8% of the weight of solids and will ordinarily be about 0.5% of that weight. In the use of the low viscosity algins these quantities may be somewhat increased.

All of the water-soluble algins, viz: the alginates of the alkali metals, magnesium, ammonium, the amines and the alkylolamines, are adapted to this use. Sodium alginate is the least costly of the salts of this group and appears to be as effective as any other member, though under some circumstances the high viscosity of solutions of ammonium alginate may cause it to be preferred.

Some of the water-soluble alginates have been found useful as adhesives per se, and this use is not claimed herein. In the instant application the algin is a minor constituent of the adhesive solids, seldom if ever representing over two percent of their total weight. In this extreme extension the results produced by the use of the algin are entirely out of proportion to the quantity employed and the actual adhesive value of the algin is a disappearing factor in its utility in the above described compositions, in which its function is that of a modifying agent.

Because of the purely physical function exercised by the algin it may be introduced into any aqueous adhesive composition which does not contain undue quantities of substances incompatible with the water-soluble algins, and thus its use is not restricted to the formulae of the examples or to any specific formulation.

The addition of the algin has a further advantage in markedly increasing the spreading property of most adhesives of this type, thus permitting materially thinner films to be applied without loss of complete and even coverage. This results not only in a saving of material but also in an improved bond. Experience has shown that, as a rule, the bond between two surfaces produced by a thin film of an adhesive composition is stronger than one produced by a thick film of the same composition, and that full adhesion is attained more rapidly as film thickness is decreased.

I claim as my invention:

1. An adhesive paste consisting substantially of water, a solid amlaceous substance having adhesive properties, and a quantity of a water-soluble salt of alginic acid not less than 0.2 percent nor more than 2.0 percent of the total weight of solids in said paste.

2. The adhesive paste of claim 1 wherein the water-soluble salt of alginic acid is the sodium salt.

3. The adhesive paste of claim 1 wherein the water-soluble salt is the ammonium salt.

VANCE V. VALLANDIGHAM.

REFERENCES CITED

The following references are of record in the file of this patent:

UNITED STATES PATENTS

| Number | Name | Date |
|--------|------|------|
| 341,072 | Stanford | May 4, 1886 |
| 2,047,978 | MacLaurin | July 21, 1936 |
| 2,158,485 | Preble | May 16, 1939 |